May 12, 1942.　　　H. HAWKINS ET AL　　　2,282,962
GEAR SHIFT REMOTE CONTROL
Filed May 21, 1940　　　2 Sheets-Sheet 2
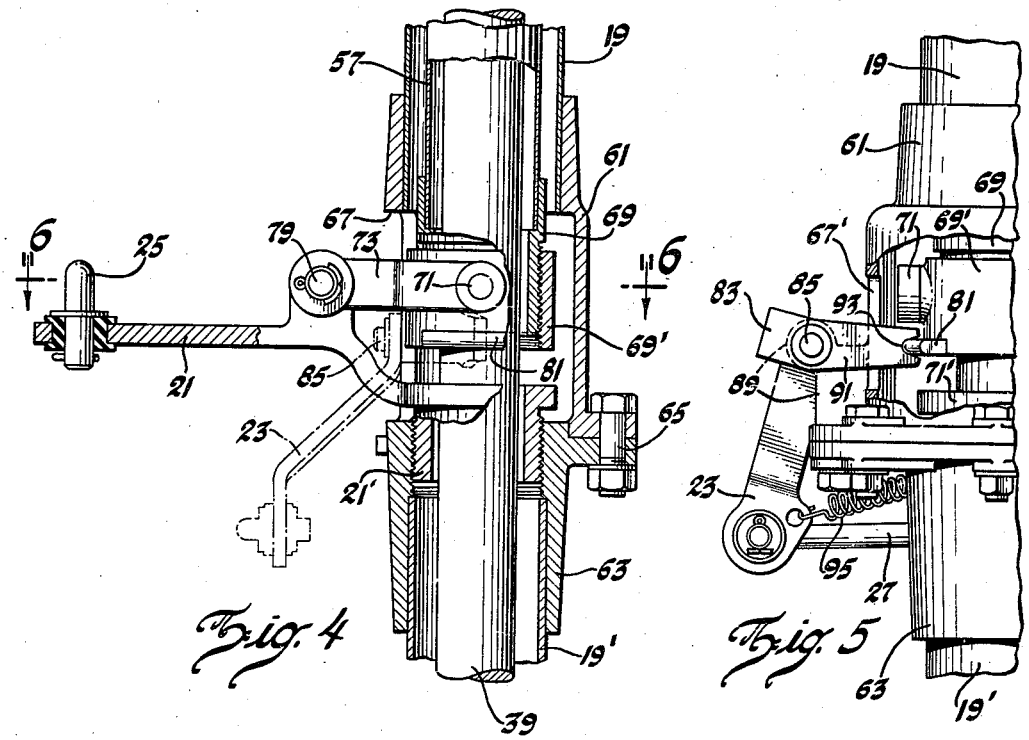
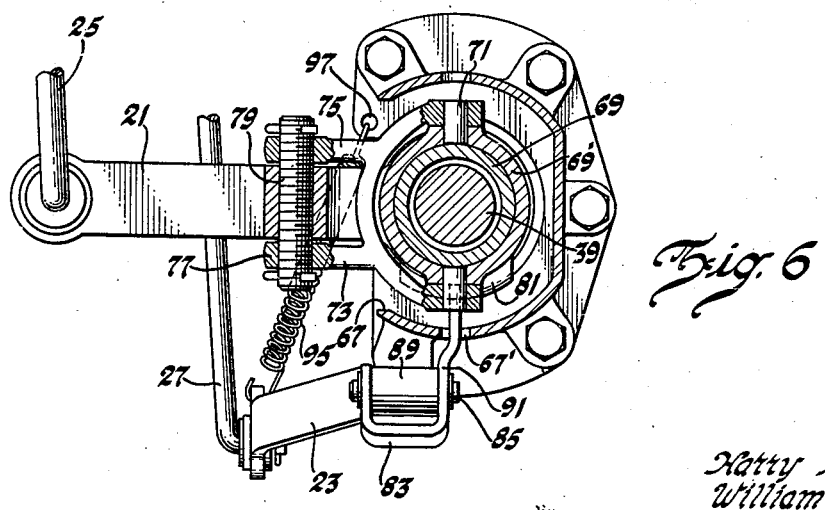
Inventors
Hatty Hawkins &
William L. Reid
By Blackmore, Spencer & Flint
Attorneys Patented May 12, 1942

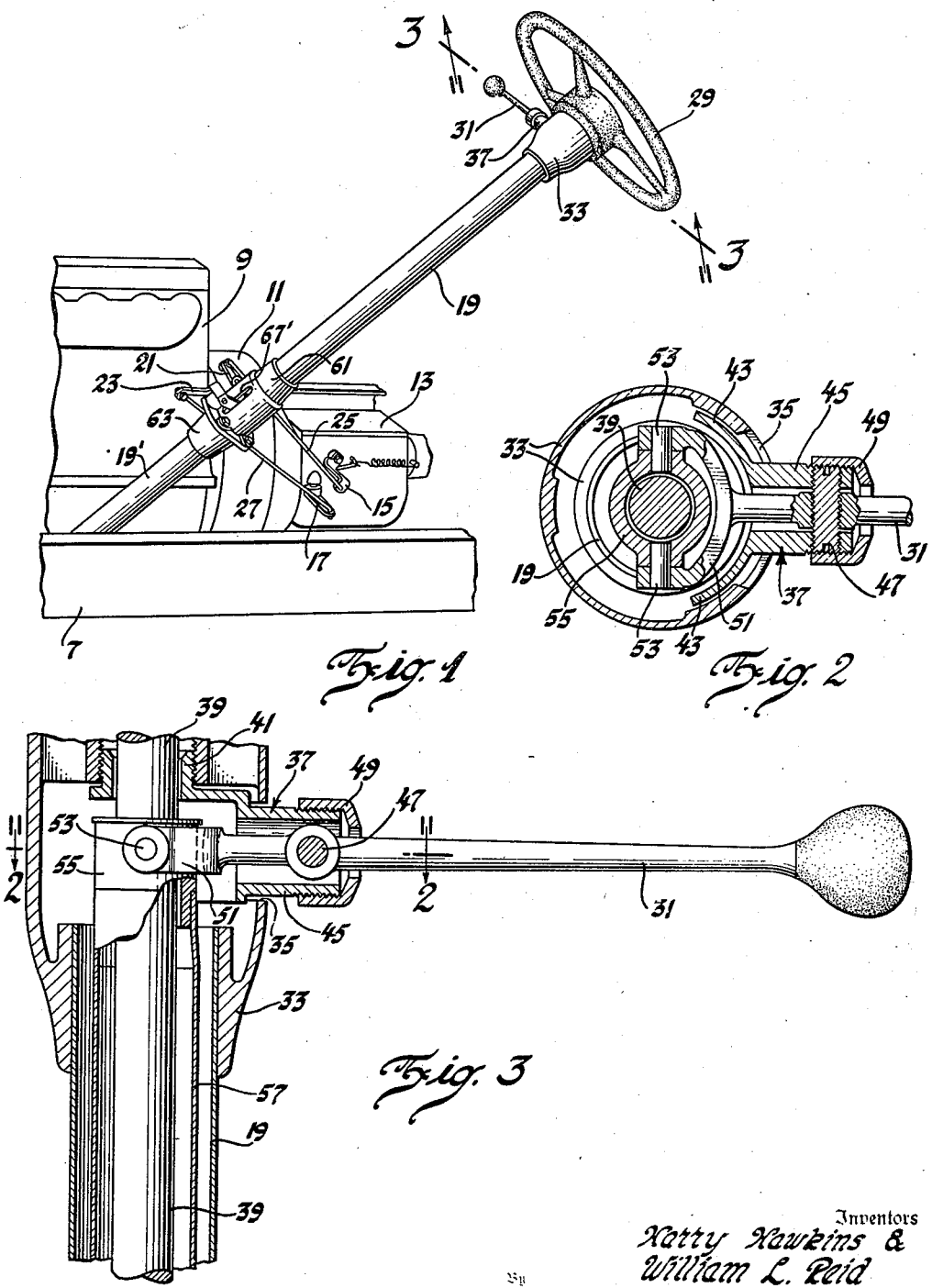

2,282,962

UNITED STATES PATENT OFFICE 2,282,962

GEAR SHIFT REMOTE CONTROL

Harry Hawkins and William L. Reid, Saginaw, Mich., assignors to General Motors Corporation, Detroit, Mich., a corporation of Delaware Application May 21, 1940, Serial No. 336,476

3 Claims. (Cl. 74—484)

This invention relates to change speed transmissions for motor vehicles and more particularly to a remote control for such transmissions and of that type wherein a manually operable lever is located adjacent the steering wheel.

An object of the invention is to improve the mechanical connection through the instrumentality of which the manually operable lever functions.

A further object is to provide such an improved connection within the steering mast and operable both by reciprocation and by rotation.

Another object is to simplify the mounting of such a connection whereby friction is avoided.

Other objects and advantages will be understood from the description which follows.

On the accompanying drawings:

Figure 1 is a perspective of a part of a motor vehicle equipped with our invention.

Figure 2 is a section on line 2—2 of Figure 3.

Figure 3 is a longitudinal section through the upper end of the steering mast.

Figure 4 is a longitudinal section through a lower part of the steering mast.

Figure 5 is a view in elevation of that part of the steering mast shown in Figure 4.

Figure 6 is a section on line 6—6 of Figure 4.

Referring by reference characters to the drawings, the frame, engine, clutch housing and transmission housing are marked 7, 9, 11 and 13, respectively. From the side of the transmission housing projection two levers 15 and 17, the former operable to make shifts from neutral to first speed and reverse or from neutral to second speed or high, dependent upon the position of a selecting device and upon the direction of lever rotation. Whether it be second and high or low and reverse is determined by selector mechanism controlled by opposite directional rotation of lever 17. No novelty is herein claimed for the mechanism within the gear housing for selecting and shifting nor for such levers as 15 and 17 to operate the parts within the gear housing. Adjacent the lower end of the steering mast 19 are levers 21 and 23, of which lever 21 is connected by a link 25 to lever 15 and lever 23 is connected by link 27 to lever 17. In this way rotation of lever 23 makes the conventional selection and lever 21 effects the actual shifting.

Just beneath the hand steering wheel 29 at the top of the steering mast 19 is a hand lever 31. Between the top of the mast 19 and the hub of the wheel 29 is a head 33 secured to the mast. The head has an opening 35 for the passage of a specially formed member 37. The opening is dimensioned to permit the member 37 to rotate about the axis of the steering shaft 39 to a limited extent. For this purpose the uppermost part of member 37 is in threaded engagement at 41 with a part of the head 33. The member 37 has lateral wings 43 within the mast as shown in Figure 2. The tubular part 45 which projects through opening 35 carries a threaded pin 47, held in position by a cap 49. The lever 31 rotates about the pin and extends through the tubular part 45. The inner end of the lever is formed into or carries a yoke 51 which is trunnioned as at 53 to a sleeve 55 carried by the upper end of a tubular shaft 57. The tubular shaft surrounds but is spaced from the steering shaft 39. By the arrangement described it will be seen that the lever 31 may be rotated about pin 47 to reciprocate the tubular shaft 57. Rotation of lever 31 about the central axis of the steering shaft is also provided. Such rotation, because of the connection between the lever and the member 37 rotates the latter about its threaded connection 41 and thereby rotates the tubular shaft 57. This latter rotation functions to make the actual changes in driving ratio within the gear housing. The reciprocation of the tubular shaft makes the selection, second and high or low and reverse. Adjacent its lower end the steering mast is divided, the extension being axially spaced from the end of part 19 and marked 19'. Parts 19 and 19' are connected by two coupling members 61 and 63 carried by the parts 19 and 19', respectively, and clamped together by bolts 65. The upper member 61 has a lateral opening 67 for the passage of parts connected to the tubular shaft 57. To the lower end of tubular shaft 57 is secured a tubular extension member which may be in one piece or formed from two pieces 69, 69' as shown.

Trunnions 71 pivot to 69' the forked arms of a connecting member 73. The member 73 extends through the opening 67 and its outer part has spaced arms 75 and 77 carrying a pivot pin 79 for a relatively long lever, the lever 21 referred to above, and to the outer end of which lever is connected the link 25. It will now be understood that when the tubular shaft 57 is rotated on its axis by the hand lever 31 the trunnion connection 71 and the pin connection 79 effect the rotation of lever 21, which rotation operates, by means of link 25 and lever 15, to move the necessary clutches or gears to make the several ratio changes. The axis of rotation of lever 21 is determined by the threaded connection between an arm 21' of the lever and part 63 as shown. This arm also extends through the opening 67. The above shifting movements are made subsequently to the conventional selecting action. This selecting action is effected by the reciprocation of the same tubular shaft by the hand lever. The reciprocation effects the selection by suitable connecting means between the extension member 69' and the lever 23, the latter acting by means of the link 27 and the lever 17 as explained above. This connection is made as follows: The member 69' has a radial flange 81. Lever 23 remote from the end to which link 27 is connected, is bent to form a part of U-shape as at 83. The side walls of the U-shaped part carry a pivot pin 85 which also extends through a part 89 rigid with the member 61. The side of the U-shaped part remote from the link connection of the lever is marked 91. It extends through an opening 67' to the flange 81 where it is notched as at 93 to operably engage the flange. Reciprocation of the tubular member 57 thus rocks lever 23 about its pivot 85 and actuates it to make the selecting movements. Since most of the shifting is between second and third, rather than between first and reverse, a spring 95 is attached to a fixed point 97 and to the lever 23, the spring being operable to bias the tubular shaft to its second and high speed position.

By the arrangements described, the trunnioned tubular shaft functions both for selection and for shifting and by means of the upper and lower trunnion supports, no frictional sliding bearings are required. The reciprocation does not affect the lever 21 because of the connecting member 73 between that lever and the shaft 57. Rotation of the tubular shaft does not affect lever 23 for the reason that flange 81 moves within the notch of lever arm 91. The connection between the hand lever and the levers 21 and 23 is within the steering mast and is concentric but out of contact with the steering shaft. In this way the mechanism does not unfavorably affect the conventional appearance of the steering mast.

We claim:

1. Remote control means for the change speed transmission of a motor vehicle having a steering mast and a steering shaft within said mast, a manually operable lever adjacent the upper end of said mast, a tubular shaft within said mast and surrounding said steering shaft, means whereby said hand lever may selectively reciprocate and rotate said tubular shaft, means including secondary levers pivoted to said mast and operably connected for mutually exclusive actuation to said tubular shaft whereby selection and ratio changes respectively are effected by independent movements of said tubular shaft, said first mentioned means including trunnions whereby said tubular shaft is supported by said hand lever, together with link means between said tubular shaft and one of said secondary levers to position the lower end of said tubular shaft.

2. Remote control means for the transmission mechanism of a motor vehicle having a tubular steering mast, a head secured to the upper end of said mast, said head being tubular and of greater diameter than said mast and formed with an arcuate slot, a steering shaft extending through said mast and head, a member mounted for rotation within and in the axis of said mast head and having a projection extending laterally through the slot of said mast head, a hand lever rotatably supported on a pin carried by said member, a tubular shaft surrounding and spaced from said steering shaft within said mast, a trunnion connection between said hand lever and said tubular shaft whereby rotation of said hand lever about the pin reciprocates the tubular shaft and whereby rotation of hand lever about the axis of the member rotates the tubular shaft and means at the opposite end of the tubular shaft to select and effect ratio changes.

3. A remote control for the change speed transmission of a motor vehicle having a steering mast and a steering shaft within said mast, a hollow shaft within said mast and surrounding said steering shaft, means at the upper end of said mast to rotate and reciprocate said hollow shaft, a lever journaled for rotation in the axis of said steering mast and adjacent the lower end of said tubular shaft, a connecting member having parallel pivotal connections with said tubular shaft and said lever on axes substantially at right angles to said lever journal whereby rotation of said tubular shaft rotates said lever, and another lever operably connected to said tubular shaft and adapted to be rocked by the reciprocation thereof, and connections from said levers for selecting and changing driving ratios within said transmission.

HARRY HAWKINS.
WILLIAM L. REID.